United States Patent [19]
Ohi

[11] Patent Number: 5,276,502
[45] Date of Patent: Jan. 4, 1994

[54] SUBJECT POSITION ADJUSTMENT APPARATUS FOR USE WITH INTERFEROMETERS

[75] Inventor: Shigenori Ohi, Tokyo, Japan

[73] Assignee: Fuji Photo Optical Co., Ltd., Omiya, Japan

[21] Appl. No.: 844,495

[22] Filed: Mar. 2, 1992

[30] Foreign Application Priority Data

Mar. 1, 1991 [JP] Japan .............................. 3-17813[U]
Mar. 1, 1991 [JP] Japan .............................. 3-17814[U]
Apr. 10, 1991 [JP] Japan .............................. 3-31870[U]

[51] Int. Cl.⁵ .............................................. G01B 11/02
[52] U.S. Cl. ..................................... 356/358; 356/244; 356/241; 356/399; 359/391; 359/392; 359/393
[58] Field of Search ............... 356/358, 244, 241, 399, 356/401, 246; 359/391, 392, 393, 503

[56] References Cited

U.S. PATENT DOCUMENTS 4,299,440 10/1981 Hodgson ............................ 359/393

Primary Examiner—Samuel A. Turner
Assistant Examiner—LaCharles P. Keesee
Attorney, Agent, or Firm—Keck, Mahin & Cate

[57] ABSTRACT

A subject position adjusting apparatus for use with an interferometer has a leveling stand disposed on a stationary stand of the interferometer. A leveling standard is stationary relative to and extends upright from the leveling stand. The leveling standard carries a subject stage for up and down movement in an axial direction of a light beam. A leveling mechanism is disposed between the stationary stand and the leveling stand. The leveling mechanism controls the angle of the leveling stand relative to a horizontal plane so as to level the leveling standard and make it parallel to the axial direction.

17 Claims, 10 Drawing Sheets

SUBJECT POSITION ADJUSTMENT APPARATUS FOR USE WITH INTERFEROMETERS

BACKGROUND OF THE INVENTION

1. Field of the Invention

This invention relates to a subject position adjustment apparatus for use with a laser interferometer.

2. Description of Related Art

Laser interferometers are typically accompanied by position adjustable stages on which a subject to be analyzed or measured is placed. For positionally adjusting a subject in any desired direction, some laser interferometers, of a type directing a laser beam downward toward the subject, have a position adjustable stage with a bi-directional position adjusting means, such as an X-Y stage, placed on a stationary base of the interferometer. Such laser interferometers also include a monodirectional position adjusting means, disposed on the bi-directional position adjusting means, on which the subject is actually placed.

Reference is made to FIG. 1, which shows a typical position adjustable stage, for the purpose of providing a brief background explanation that will enhance an understanding of the position adjustment of a laser interferometer stage.

A position adjustable stage 100 of a laser interferometer includes a bi-directional position adjusting or X-Y stage 101, placed on a stationary base 102 of the laser interferometer, and a mono-directional position adjusting or vertical position adjusting stand 103, disposed on the X-Y stage 101. The vertical position adjusting stand 103 is provided with a subject table 104 on which a subject to be measured is placed in an optical axis Xo of an objective lens Lo of the laser interferometer. Positioning of the subject is performed by operating the X-Y stage 101 so as to move the subject in two horizontal directions perpendicular to each other and by operating the vertical position adjusting stage 103 to move the subject up or down along the optical axis Xo. These operations may be performed in this order or vice versa.

If the direction in which the vertical position adjusting stage 103 moves to adjust a subject in vertical position is not parallel to the optical axis Xo of the laser interferometer, both the X-Y stage 101 and the vertical position adjusting stage 103 must be repeatedly operated in order to keep an interference pattern within a view field of an operator or a view field of a monitor camera.

In order to support the vertical position adjusting stage 103 on the X-Y stage 101, the X-Y stage 101 must be structurally rigid, unavoidably leading to large stage size. As a result, adjusting knobs of the X-Y stage 101, which are separated by a long distance, are somewhat troublesome to operate. In addition, since the stage 104, supported on the vertical position adjusting stage 103, has a vertical movement which is limited and small, measurement is restricted to small and, in particular, relatively thin subjects.

SUMMARY OF THE INVENTION

It is an object of the present invention to provide a subject position adjusting apparatus for an interferometer which is easily operated for subject position adjustment and which is compact in size.

It is another object of the present invention to provide a subject position adjusting apparatus for an interferometer which reduces measurement error due to external vibrations.

The foregoing objects are accomplished, according to the present invention, by providing a subject position adjusting apparatus for use with an interferometer of the type having a base stand and a stationary upright column which extends upward from the base stand and carries an interferometric system including at least a coherent light source, such as a laser source, for generating a light beam and an optical system for directing the light beam to a subject placed on a subject stage for measurement and forming an interference pattern concerning the surface of the subject. The subject position adjusting apparatus includes a leveling stand disposed on the base stand and a leveling standard. The leveling standard is stationary, extends upright from the leveling stand and carries the subject stage for up and down movement in an axial direction of the light beam. The subject position adjusting apparatus further includes leveling means, disposed between the base stand and the leveling stand, for controlling an angle of the leveling stand relative to a horizontal plane, i.e., an inclination of the leveling stand with respect to the base stand of the interferometer, so as to adjust the leveling standard so that it is parallel to the axial direction of the light beam. A bi-directional stage, such as an X-Y stage, which may be of any known type, is used to provide an actual flat surface of the subject stage on which a subject is placed. Between the leveling standard guide and the subject stage, there are provided a vertical coarse-motion clamp means for coarsely adjusting the vertical position of the subject stage and a vertical fine-motion clamp means for finely adjusting the vertical position of the subject stage.

After leveling the leveling stand by the leveling means so as to adjust the stationary upright guide 6 to be parallel to the optical axis of the light beam and fixing the leveling stand to the base stage, the subject stage is adjusted in vertical position and in two horizontal directions perpendicular to each other. A surface of a subject to be measured is placed on the subject stage so as to form a small interference pattern size with reflected lights from the subject surface and a standard surface. The interference pattern is desirably picked up by an image pick-up device, such as a small CCD image pick-up device, and is viewed on a monitor screen. Along with adjusting the subject stage in the two horizontal directions, the subject stage is coarsely moved vertically up and down until an enlarged interference pattern appears on the monitor screen. When an adequately enlarged interference pattern is viewed on the monitor screen, the subject stage is clamped by the vertical coarse-motion clamp means. Then, the fine-motion clamp means and the bi-directional positioning means are operated so as to display a clear image of the interference pattern on the monitor screen.

BRIEF DESCRIPTION OF THE DRAWINGS

The above and other objects, and various features of the present invention, will be apparent to those skilled in the art from the following description of preferred embodiments thereof when considered in conjunction with the drawings associated with this application, in which same reference numbers have been used to designate the same or similar elements throughout the drawings, and wherein.

DETAILED DESCRIPTION OF THE PREFERRED EMBODIMENTS

Figure 1:
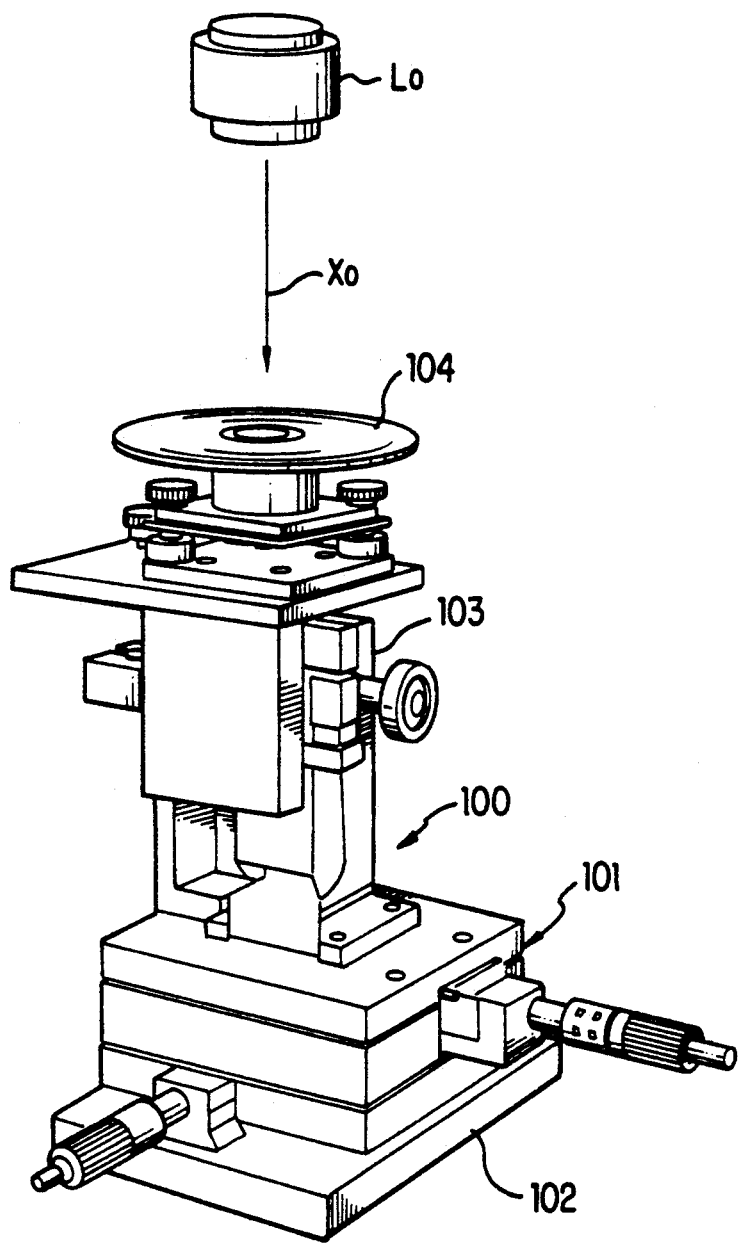
FIG. 1, as noted above, is a perspective view of a subject stage and subject position adjusting apparatus of a conventional interferometer.
Figure 2:
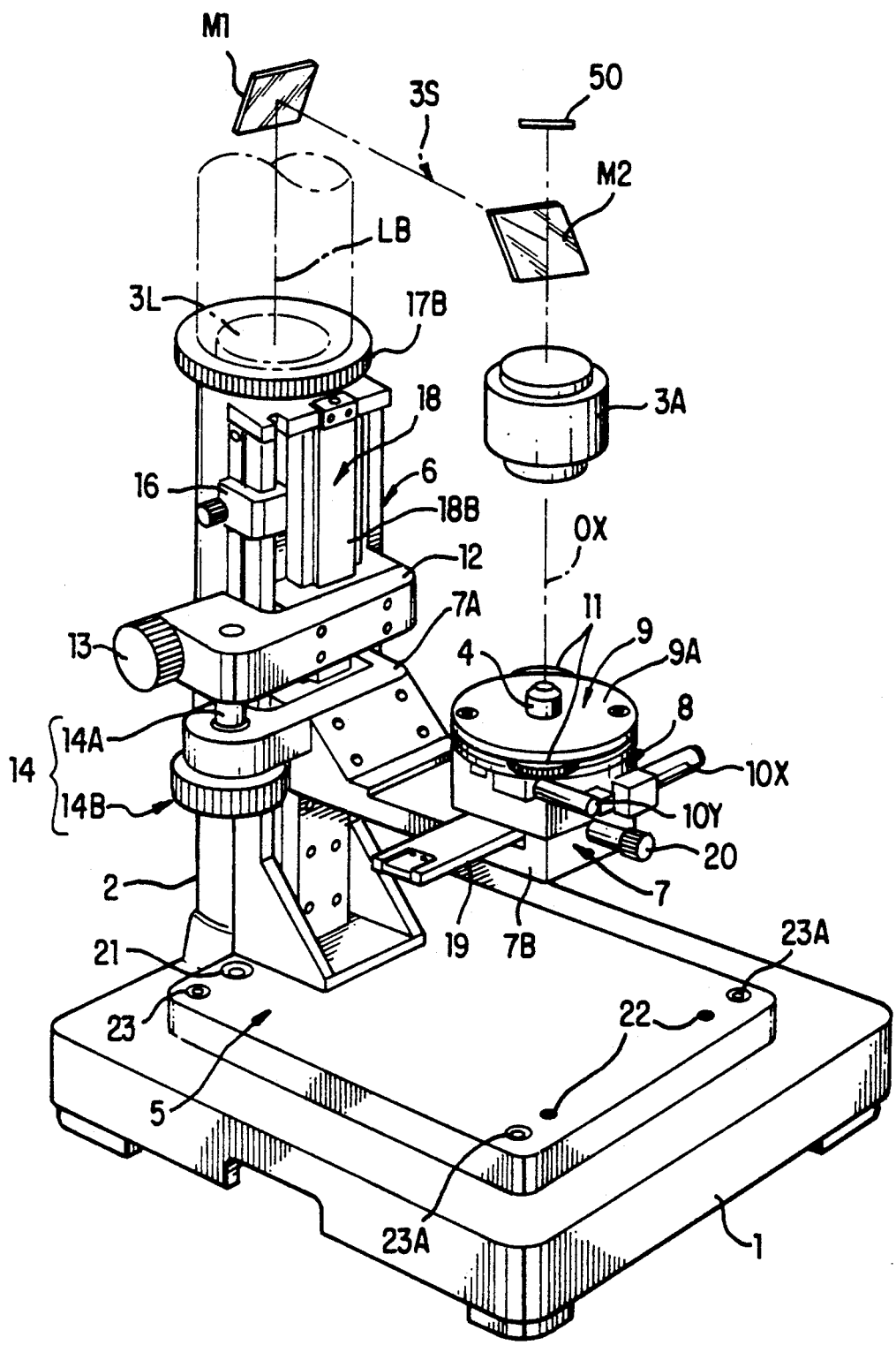
FIG. 2 is a perspective view showing a laser interferometer with a subject position adjusting apparatus according to a preferred embodiment of the invention.

Referring to the drawings in detail and, in particular, to FIGS. 2, 3, 4 and 5, a laser interferometer with a subject position adjustment apparatus according to a preferred embodiment of the present invention is shown. The laser interferometer comprises a generally square-shaped base stand 1 and a stationary upright column 2, fixedly secured to and extending vertically from the stationary base stand 1. The stationary upright column 2 is formed as a rigid hollow pipe so as to receive therein a laser source 3L, forming part of a laser interferometric system 3S, which generates a laser beam LB. An optical head 3, which carries essential parts of the laser interferometric system 3S, such as a total reflection mirror M1, a half mirror M2 and an objective standard lens 3A, is mounted for up and down movement on the stationary upright column 2. As shown in detail in FIG. 5, the optical head 3 comprises a main housing 3a, a slidable support barrel 3b, on which the main housing 3a is supported, and a barrel-shaped lens mount 3c, all of which are prepared as a single unit so as to be detachably mounted on the stationary upright column 2. The slidable support barrel 3b of the optical head 3 is slidably mounted on an upper portion of the stationary upright column 2 where external threads 2A are cut. The optical head 3 is adjusted and fixed in vertical position by fastening a head-locking clamp 3d, after being slid up or down, via a positioning screw ring 17A. Laser beam LB, emitted vertically upward from the laser source 3L, is reflected two times by the mirrors M1 and M2 so as to be directed vertically downward and parallel to the stationary upright column 2. The laser beam is focused by the objective standard lens 3A detachably mounted to the lens mount 3c of the optical head 3.

Figure 4:
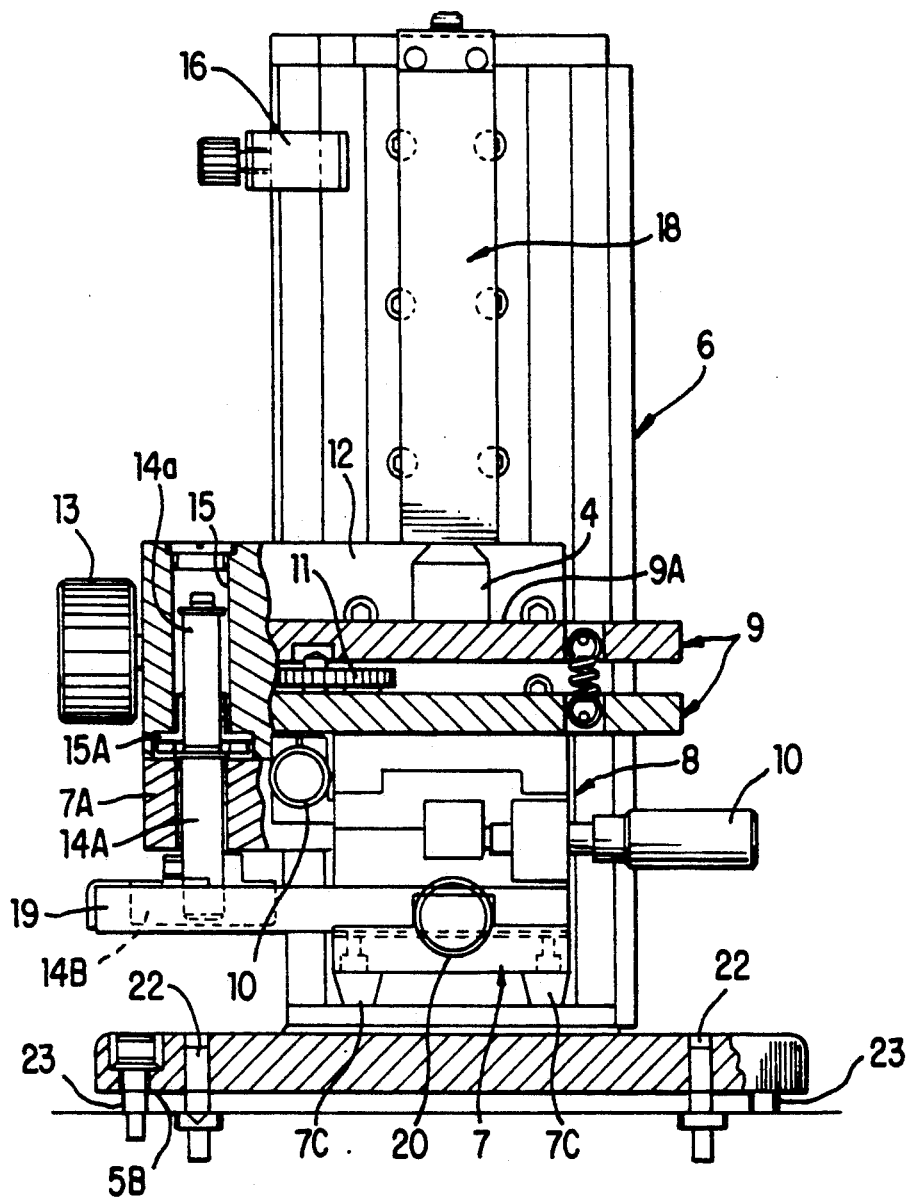
FIG. 4 is a front view, partially in cross-section, of the subject position adjusting apparatus shown in FIG. 2.
Figure 5:
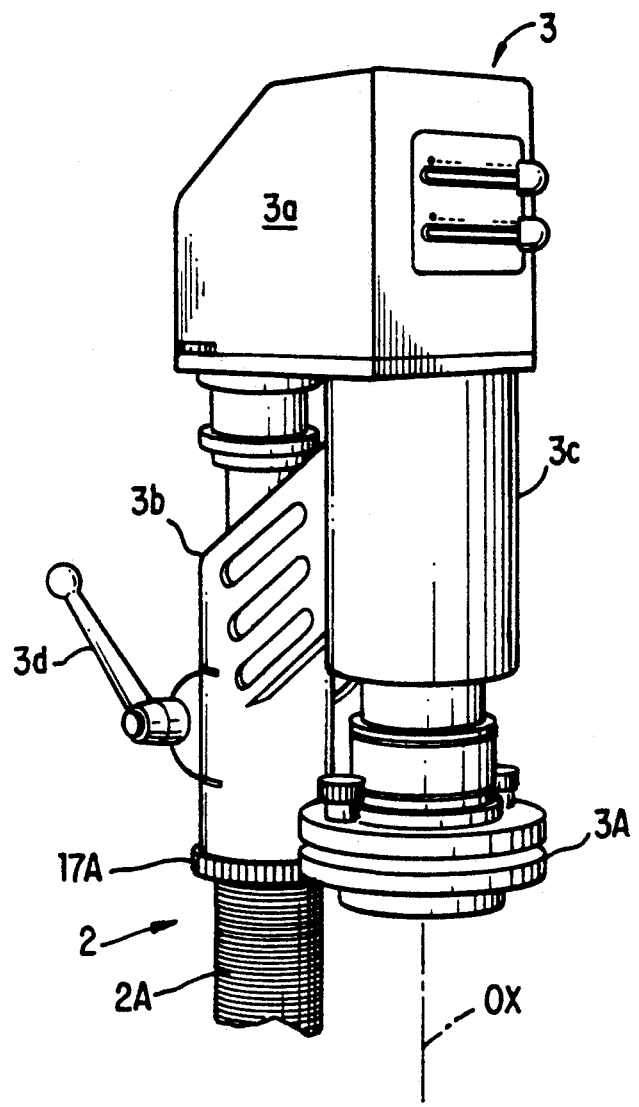
FIG. 5 is a perspective view showing an optical head of the laser interferometer.

On the stationary base stage 1, there is disposed a generally square-shaped leveling stage 5, smaller than the stationary base stage 1, which cooperates with a leveling means which will be described in detail later. The leveling stage 5 is provided with a stationary upright leveling standard guide, such as a stationary leveling standard 6, fixedly secured to and extending vertically from the leveling stand 5 so as to be parallel to the stationary upright column 2. A stage carrier 7, having a stage surface almost parallel to the leveling stand 5, is supported for up and down sliding movement by the stationary leveling standard 6. Further, a positioning block 12, cooperating with the stage carrier 7, is supported for up and down sliding movement by the stationary leveling standard 6. In detail, the stage carrier 7 includes a guide mount portion 7A, slidably mounted for up and down movement by the stationary leveling standard 6, and a carrier portion 7B extending from the guide mount portion 7A beyond an optical axis OX of the objective standard lens 3A. The positioning block 12, disposed above the guide mount portion 7A of the stage carrier 7, is slidably mounted for up and down movement on the stationary leveling standard 6 and is adapted to be fixed in desired position by a clamp knob 13. There is provided, between the stage carrier 7 and the positioning block 12, a fine position adjustment 14 for adjusting and fixing the vertical position of the stage carrier 7 relative to the positioning block 12. The fine position adjustment 14 comprises a connecting rod 14A, rotatively supported, but restricted in its axial movement, by the guide mount portion 7A of the stage carrier 7, and a fine adjustment knob 14B fixedly secured to a lower end of the connecting rod 14A. The upper half portion of the connecting rod 14A is formed with fine external threads 14a screwed into a sleeve 15A, with internal threads, which is fixedly fitted into a bore 15 formed in the positioning block 12. Turning the fine adjustment knob 14B causes a fine relative movement between the stage carrier 7 and the positioning block 12 so as to move the stage carrier 7 away from and closer to the positioning block 12. The stage carrier 7, thus cooperating with the positioning block 12 and the fine position adjustment 14, is adjusted in vertical position coarsely by the positioning block 12 with the clamp knob 13 and then finely by the fine position adjustment knob 14B. The stage carrier 7, cooperating with the positioning block 12, is accompanied by a balancing means 18, which will be described in detail later, so as to move gently and smoothly. As is seen in FIG. 4, the stage carrier 7 is provided with cushioning pads 7C, made of a rubber.

On the stage carrier 7, there is provided an X-Y stage 8, as a bi-directional position adjusting means, fixedly mounted on a slide mount 19. The slide mount 19 is supported for sliding movement in a direction perpendicular to the optical axis OX of the laser interferometric system 3S, for instance, in a left to right direction as viewed from the front, by the stage carrier 7. The slide mount is locked to the stage carrier 7 by a slide-lock screw 20. The X-Y stage 8 mounts thereon a bi-axial adjustment stage 9 for providing a stage surface 9A, on which a subject S, an upper surface of which is analyzed or measured, is placed. If a subject S is relatively small, an extra stage 4 may be mounted on the bi-axial adjustment stage 9 so as to be intersected by the optical axis OX of the laser interferometric system 3S. The X-Y stage 8 has a pair of adjustment knobs 10X and 10Y for shifting the bi-axial adjustment stage 9 in perpendicularly intersecting directions, i.e., in both an X-direction and a Y-direction, which are perpendicular to each other, in a horizontal plane. The bi-axial adjustment stage 9 has a pair of adjustment screws 11 for finely tilting its own vertical center axis. These stages 8 and 9 are well known in structure and operation and are commercially available.

In order to prevent the objective lens 3A from being struck and damaged by the bi-axial adjustment stage 9 or the extra stage 4 mounted on the bi-axial adjustment stage 9, the stationary leveling standard 6 is provided with a positioning stopper 16, slidably mounted thereon, for restricting an upper position of the positioning block 12 below the subjective standard lens 3A. The stage carrier 7 is accompanied by a balancing means 18 for smooth up and down movement.

Figure 6:
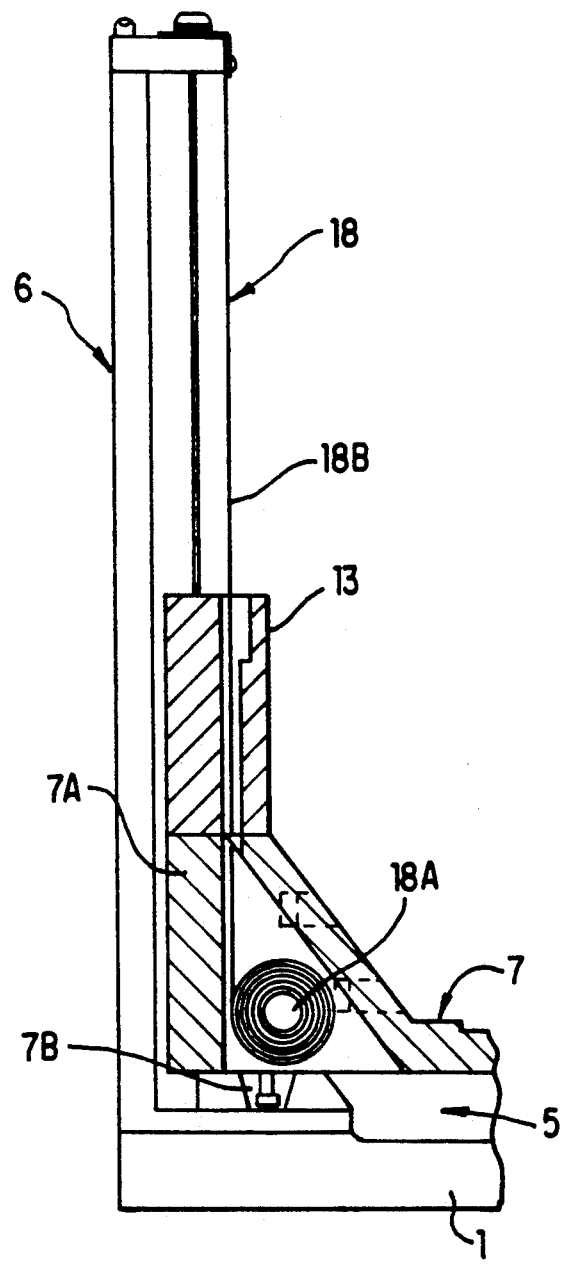
FIG. 6 is a side view, partially in cross-section, of a balancing device of the interferometer shown in FIG. 2.

Referring to FIG. 6, the balancing means 18 may be seen to include a thin elastic or thin flexible steel blade 18B which is secured, at one end, to the upper of the stationary leveling standard 6 and, at the other end, to a core shaft 18A rotatively supported by the guide mount portion 7A of the stage carrier 7. The major portion of the steel blade 18B is coiled around the core shaft 18A. Between the core shaft 18A and the steel blade 18B there is mounted a coil spring (not shown) so as to suspend the stage carrier 7 and in balance it in its own position when the clamp knob 13 of the positioning block 12 is loosened. In other words, the core shaft 18A is forced, by the coil spring, to wind the steel blade 18B thereon as the positioning block 12 is moved upward, and is allowed to unwind or withdraw the steel blade 18B from the coil as the positioning block 12 is moved downwards. The stage carrier 7 is suspended and balanced by the balancing means 18 while the clamp knob 13 of the positioning block 12 is loosened. Consequently, the stage carrier is prevented, by the aid of the balancing means 18, from suddenly falling down.

Referring back to FIGS. 3 and 4, between the stationary base stand 1 and the leveling stand 5, there is provided a leveling means for controlling or adjusting the level of the leveling stand 5 with respect to the stationary base stand 1. The leveling means comprises a fulcrum steel ball 21, rotatively received in a recess 5A formed in the leveling stand 5 and kept in contact with the leveling stand 5, and a plurality of, for instance three, leveling screws 22, rotatively held by the leveling stand 5 so as to vary in the lengths in which they project from the leveling stand 5. The fulcrum steel ball 21 and leveling screws 22 are arranged in a square formation. Adjacent to the fulcrum ball 21 and leveling screws 22, there are clamp screws 23 with clamp knobs 23A, each clamp screw 23 being rotatively held in a shouldered bore 5B formed in the leveling stand 5. The clamp screws 23, when fastened to the stationary base stand 1, fix the leveling stand 5 with respect to the stationary base 1. When turning the leveling screws 22 selectively or in combination, the leveling stand 5 is tilted to any desired inclination or leveled with respect to the stationary base stand 1, using the fulcrum ball 21 as a fulcrum point. Turning the clamp knobs 23A, after having leveled the leveling stand 5, clamps the leveling stand 5 at the desired inclination with respect to the stationary stand 1.

Figure 3:
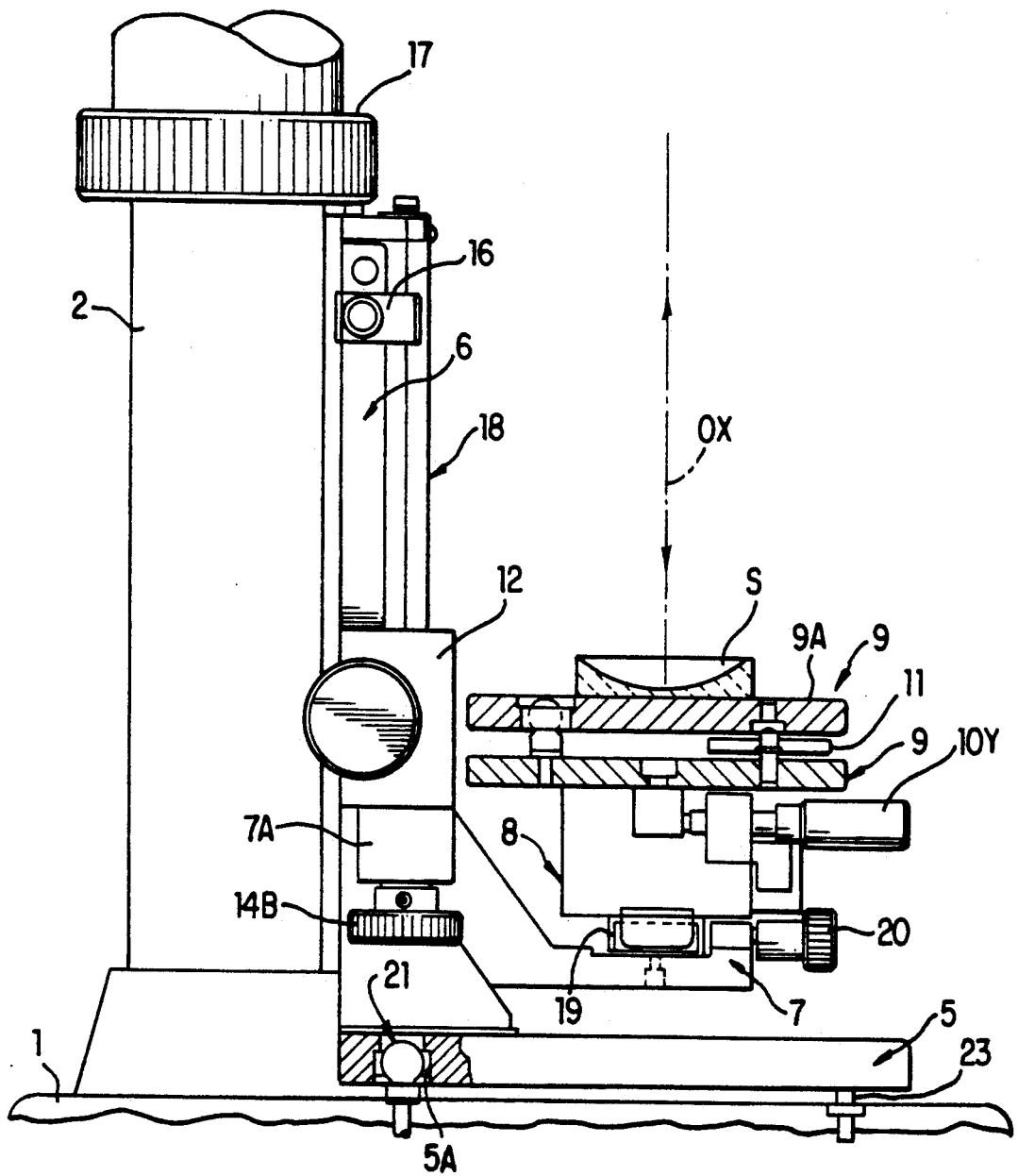
FIG. 3 is a side view, partially in cross-section, of the subject position adjusting apparatus shown in FIG. 2.
Figure 7:
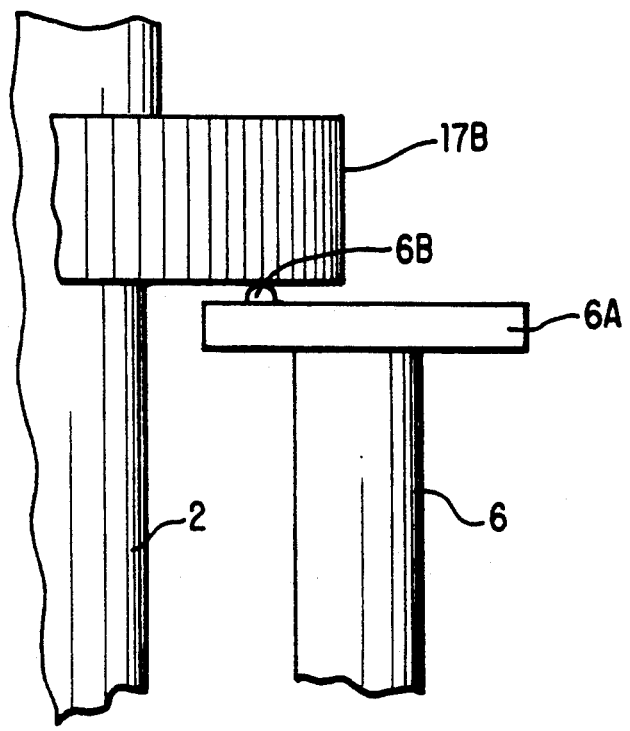
FIG. 7 is a side view showing a clamping means.

As is shown in detail in FIGS. 3 and 7, the subject position adjusting apparatus, after the adjustment of the stationary leveling standard 6, is also coupled to the stationary upright column 2 by a locking clamp 17B threadingly mounted on a threaded portion 2B of the stationary upright column 2. For easy coupling, the stationary leveling standard 6 is provided with a flange-shaped locking head 6A secured thereto. The locking head 6A has a semi-spherical ball 6B secured thereto. When the locking clamp 17B is turned and moved down, the locking head 6A is pressed by the locking clamp 17B through the semi-spherical ball 6B, so as to firmly lock or couple the stationary leveling standard 6 to the stationary upright column 2 in the proper position. Firmly locking the stationary leveling standard 6 to the stationary upright column 2 prevents the stationary leveling standard 6, and hence the carrier stage 7, from causing relative vibrations with respect to and independently from the stationary upright column 2, so that a subject S on the carrier stage 7 is free from vibrations relative to the laser interferometric system 3S during measurement. It is not always necessary to provide the semi-spherical ball 6B.

In order to level the stage surface 9A of the bi-axial adjustment stage 9, mounted on the X-Y stage 8 of the stage carrier 7, so that the stage surface 9A is vertically intersected by the optical axis OX of the objective standard lens 3A of the laser interferometric system 3S, the stationary leveling standard 6, extending from the leveling stand 5, is adjusted. In this way, the stage surface 9A can be kept level in any vertical position. The adjustment of the stationary leveling standard 6 is performed with the standard objective lens 3A detached from the optical head 3. During adjustment of the stationary leveling standard 6, it is preferred to increase the brightness of the laser beam LB to its peak and dim room lights sufficiently to provide a high contrast between the laser beam LB and the room.

First, a reference circle having a diameter as large as that of the collimated laser beam LB, for example, approximately 64 mm, and crossed lines in the reference circle, on an alignment sheet are drawn. The alignment sheet is fixedly placed on the bi-axial adjustment stage 9 so that the reference circle of the alignment sheet is approximately centered with respect to the stage surface 9A. The first adjustment operation is to lower the positioning block 12 to its lower limit position after loosening the clamp knobs 13 and 23A. Then, if the collimated laser beam LB does not conform to the reference circle, the leveling screws 22 are selectively turned to level the leveling stage 5 and, hence, the stationary leveling standard 6, so as to bring the reference circle into positional conformity with the collimated laser beam LB as accurately as possible. The positioning block 12 is thereafter lifted to its upper limit position. There, the leveling stand 5, and hence the stationary leveling standard 6, is finely leveled again by selectively turning the leveling screws 22 so as to bring the reference circle into positional conformity with the collimated laser beam LB as accurately as possible at the upper limit position. This leveling operation may be repeated to make a deviation between the collimated laser beam LB and the reference circle less and less, and finally provide an accurate positional conformity between the reference circle and the collimated laser beam LB at the upper and lower limit positions.

When an accurate positional conformity is achieved between the reference circle and the collimated laser beam LB, all of the clamp knobs 23A are fastened to clamp the leveling stand 5 to the stationary base stand 1. Upon clamping the leveling stand 5, the positioning block 12 is preferably maintained in its lower limit position until the clamp knobs 23 are brought into contact with the shoulders of the bores 5B of the leveling stand 5 for preliminarily clamping or holding the leveling stand 5 in its desirably leveled position. The positioning block 12 is then lifted up to and clamped in the upper limit position before firmly or tightly fastening the clamp knobs 23A so as to firmly hold the leveling stand 5 in the desirably leveled position. To keep the accurate positional conformity between the reference circle and the collimated laser beam while the clamp knobs 23A are tightly fastened, it is preferred to turn the clamp knobs 23A little by little, one after another, in random order and to repeatedly turn them in different orders so as to apply clamping force to the leveling stand 5 equally at the four clamping positions. For preliminary clamping the leveling stand 5, it is preferred to complete leveling of the leveling stand 5 while the positioning block 12 is in the lowest position.

When the stage surface 9A of the bi-axial adjustment stage 9 mounted on the X-Y stage 8 of the stage carrier 7 has been leveled, the stage surface 9A is vertically intersected by the optical axis OX of the standard objective lens 3A of the laser interferometric optical system 3S in any vertical position. For performing interferometric measurement of optical elements, such as lenses and optical flats, after placing a subject S on the bi-axial adjustment stage 9 mounted on the X-Y stage 8 of the stage carrier 7, the subject S is moved vertically and horizontally, namely, in three-directions, by operating the positioning block 12 and the X-Y stage 8 so as to be struck, at a center of a surface of the subject S to be measured, by the laser beam LB. The laser beam LB is partly reflected by and partly passes through a standard surface of the objective lens 3A. The laser beam LB, passed through the objective lens 3A, is then reflected by a surface of the subject S. The reflected laser beams LB from the standard surface of the objective lens 3A and the surface of the subject S interfere to form a small size interference pattern and pass through the half mirror M2. This interference pattern is picked up by an image pick-up device 50, such as a small charge coupled device (CCD), disposed behind the half mirror M2 in the optical head 3, and displayed on a monitor screen (not shown). The positioning block 12 is moved coarsely in order to enlarge the interference pattern operating the X-Y stage 8 so as to keep the interference pattern within the monitor screen. When a desirably enlarged interference pattern is observed on the monitor screen, the positioning block 12 is fixed or clamped by the clamp knob 13. For clear observation of the interference pattern on the monitor screen, the fine position adjustment knob 14 of the stage carrier 7 and the adjustment knobs 10X and 10Y of the X-Y stage 8 are operated. The clamp knob 17B is then operated so as to structurally couple the stationary leveling standard 6 together with the stationary upright column 2.

When a subject, such as a lens, is relatively small, the extra stage 4, with the small subject put thereon, is fixedly placed on the bi-axial adjustment stage 9 mounted on the X-Y stage 8 of the stage carrier 7 and adjusted in position so as to be struck at a center of a surface of the small subject by the laser beam LB.

Figure 8:
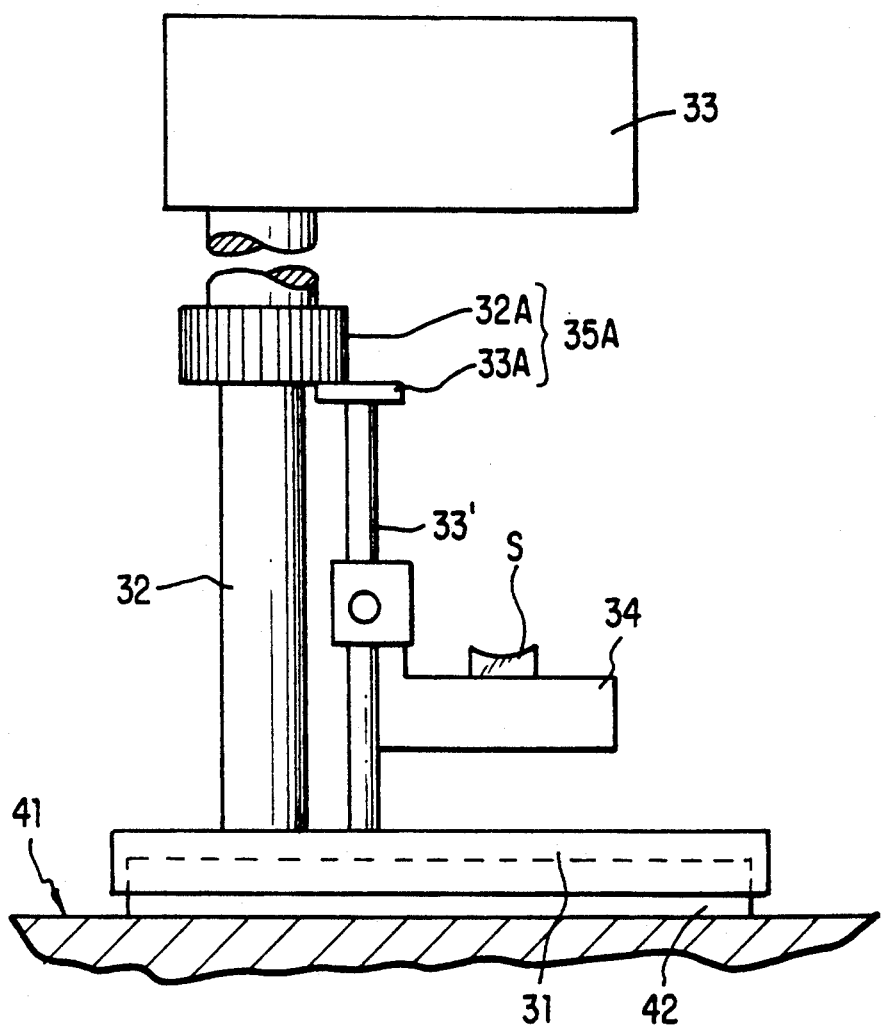
FIG. 8 is a schematic side view showing a laser interferometer with a subject position adjusting apparatus according to another preferred embodiment of the invention.

Referring to FIG. 8, a subject position adjusting apparatus for use with an interferometer according to another preferred embodiment of the present invention is shown. In this embodiment, external vibrations transmitted to the interferometric system and a subject through a base stage are eliminated. Even extremely slight vibrations will affect the interferometer when it is used for highly accurate measurements and can cause large measurement errors.

A laser interferometer is placed on a flat table-like vibration isolator 42, such as an air spring cushioning well known in the art, formed on a flat floor or a desk 41. The laser interferometer comprises a generally square-shaped base stand 31 and a stationary upright column 32, fixedly secured to and extending vertically from the stationary base stand 31. The stationary upright column 2 is formed as a rigid hollow pipe so as to receive therein a laser source, forming part of a laser interferometric system. An optical head 33, which carries therein essential parts of the laser interferometric system, such as reflection mirrors and an objective standard lens, is mounted for up and down movement on the stationary upright column 32. Laser beam LB, emitted vertically upward from the laser source, is reflected two times by the mirrors so as to be directed vertically downward and parallel to the stationary upright column 32.

The base stand 31 is further provided with a standard rod 33' fixedly secured to and extending vertically from the base stand 31 so as to be parallel to the stationary upright column 32. A subject stage 34 is supported for up and down sliding movement parallel to the laser beam LB by the standard rod 33'. The standard rod 33' is provided at its top end with a flange-shaped clocking head 33A, forming part of a coupling means 35A, secured thereto. On the other hand, the stationary upright column 32 threadingly mounts thereon a locking clamp 37A, forming another part of the coupling means 35A. When the locking clamp 17B is turned and moved down, the locking head 6A is pressed by the locking clamp 17B, so as to firmly lock or couple the standard rod 33' and the stationary upright column 32 together. Firmly locking the standard rod 33' to the stationary upright column 2 prevents the standard rod 33', and hence the subject stage 34, from causing relative vibrations with respect to, and independently from, the stationary upright column 2, so that a subject S on the subject stage 34 is free from vibrations relative to the laser interferometric system 3S during measurement even when vibrations caused by various external factors can not be absorbed by the vibration isolator 42 and are transmitted to the standard rod 33'.

Figure 9:
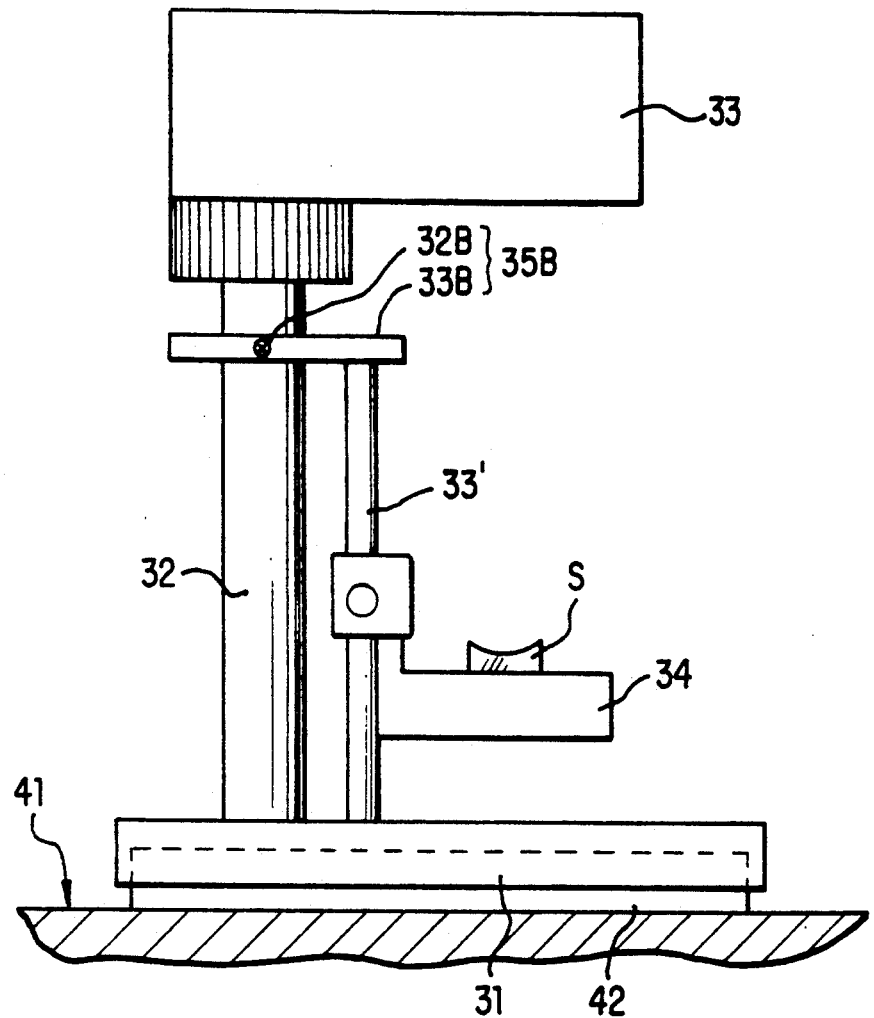
FIG. 9 is a schematic side view showing a modification of the subject position adjusting apparatus shown in FIG. 8.
Figure 10:
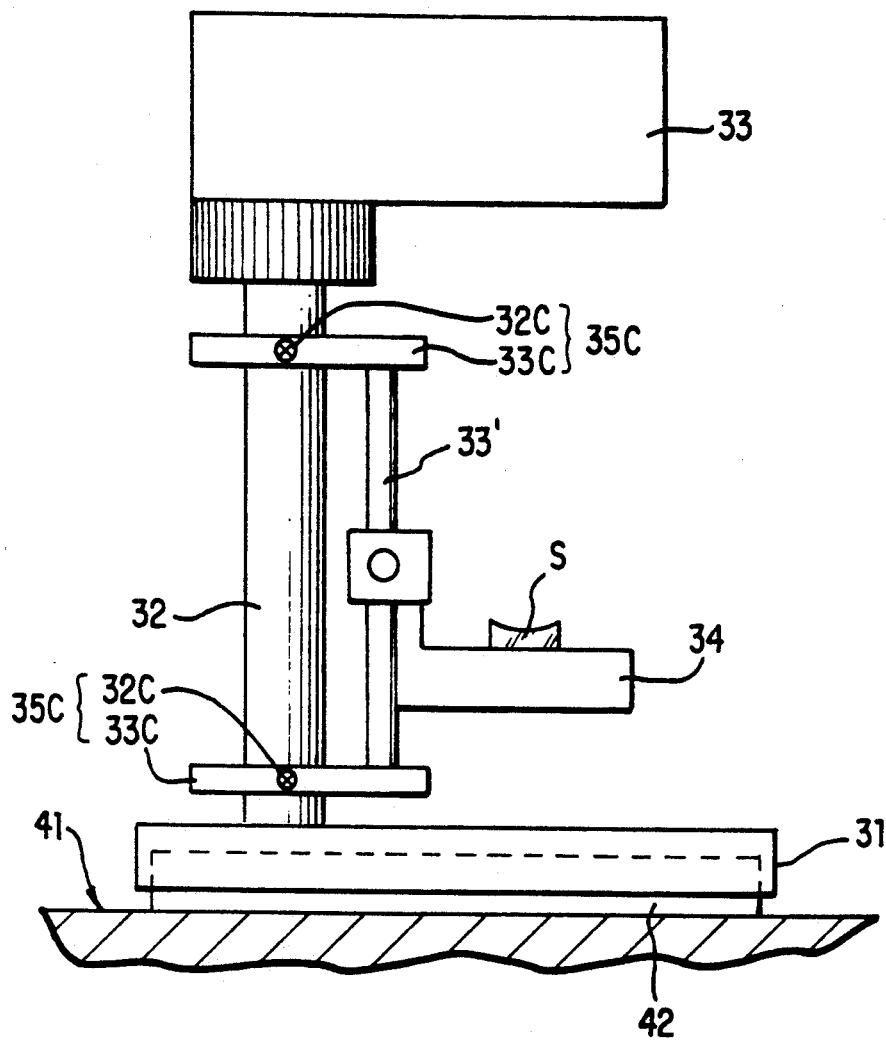
FIG. 10 is a schematic side view showing another modification of the subject position adjusting apparatus shown in FIG. 8.

The coupling means 35A shown in FIG. 8 may be modified in various fashions, as shown in FIGS. 9 and 10.

Referring to FIG. 9, a coupling means 35B comprises a forked coupling arm 33B, secured to and extending from the top end of a standard rod 33', and coupling screws 32B for fastening a forked portion of the coupling arm 33B to a stationary upright column 32 at diametrically opposite points.

Referring to FIG. 10, a standard rod 33'. by which a subject stage 34 is supported for up and down movement, is held by upper and lower coupling means 35C. Each coupling means 35C comprises a forked coupling arm 33C, secured to and extending from the top or bottom end of a standard rod 33', and coupling screws 32C for fastening a forked portion of the coupling arm 33C to a stationary upright column 32 at diametrically opposite points.

It is to be understood that although the present invention has been described in detail with respect to preferred embodiments thereof, various other embodiments and variations may occur to those skilled in the art. Any such other embodiments and variations which fall within the scope and spirit of the invention are intended to be covered by the following claims.

What is claimed is:

1. A subject position adjusting apparatus for use with an interferometer having a stationary base stand and a stationary upright column extending from said base stand, said stationary upright column carrying at least a coherent light source for generating a light beam and an optical system for directing the light beam toward a subject placed on a subject stage for measurement and producing an interference pattern with reflected light from a surface of the subject and a standard surface, said subject position adjusting apparatus comprising:

a leveling stand disposed on said base stand;

a stationary leveling standard, extending upright from said leveling stand, which carries said subject stage for up and down movement in an axial direction of said light beam; and leveling means, disposed between said base stand and said leveling stand, for controlling said leveling stand so as to level said leveling standard so that it is parallel to said axial direction.

2. A subject position adjusting apparatus as recited in claim 1, wherein said leveling means comprises a pivot fixed to one of said base stand and said leveling stand, and at least two leveling screws, rotatively supported by said one of said base stand and said leveling stand, for controlling the angle of said leveling stand using said pivot as a fulcrum.

3. A subject position adjusting apparatus as recited in claim 2, wherein said leveling means further comprises clamping means for clamping said leveling stand to said stationary base stand.

4. A subject position adjusting apparatus as recited in claim 3, wherein said pivot comprises a ball.

5. A subject position adjusting apparatus as recited in claim 2, and further comprising bi-directional positioning means, disposed on said subject stage, for providing a flat surface on which a subject is placed and for shifting the subject in two directions perpendicular to each other.

6. A subject position adjusting apparatus as recited in claim 5, wherein said bi-directional positioning means comprises an X-Y stage.

7. A subject position adjusting apparatus as recited in claim 2, and further comprising a vertical coarse-motion clamp means for coarsely adjusting a vertical position of said subject stage.

8. A subject position adjusting apparatus recited in claim 7, and further comprising a vertical fine-motion clamp means for finely adjusting the vertical position of said subject stage.

9. A subject position adjusting apparatus as recited in claim 2, and further comprising a balancing means for balancing and suspending said subject stage when said subject stage is loosened.

10. A subject position adjusting apparatus as recited in claim 2, and further comprising a clamping means for clamping said leveling standard together with said stationary upright column.

11. A subject position adjusting apparatus as recited in claim 1, wherein said coherent light source is a laser generating device.

12. A subject position adjusting apparatus for use with an interferometer having a stationary base stand and a stationary upright column extending from said base stand, said stationary upright column carrying at least a coherent light source for generating a light beam and an optical system for directing the light beam toward a subject placed on a subject stage for measurement and producing an interference pattern with reflected light from a surface of the subject and a standard surface, said subject position adjusting apparatus comprising:

a leveling base stand disposed on said base stand;

a standard guide, stationary with respect to and extending upright from said leveling base stand, which carries said subject stage for up and down movement in an axial direction of said light beam; and bi-directional positioning means, disposed on said subject stage, for providing a plane on which to place a subject and for shifting the subject in two directions perpendicular to each other.

13. A subject position adjusting apparatus as recited in claim 12, wherein said bi-directional positioning means is an X-Y stage.

14. A subject position adjusting apparatus as recited in claim 12, wherein said base stand comprises a vibration isolator.

15. A subject position adjusting apparatus as recited in claim 14, wherein said vibration isolator is an air spring.

16. A subject position adjusting apparatus as recited in claim 12, and further comprising a clamping means for clamping said standard guide together with said stationary upright column.

17. A subject position adjusting apparatus as recited in claim 12, wherein said coherent light source is a laser generating device.

* * * * *